(12) United States Patent
Kim et al.

(10) Patent No.: US 9,944,053 B2
(45) Date of Patent: *Apr. 17, 2018

(54) LAMINATE SHEET, METHOD OF MANUFACTURING THE LAMINATE SHEET, AND ARTICLE USING THE LAMINATE SHEET

(71) Applicant: Lotte Advanced Materials Co., Ltd., Yeosu-si (KR)

(72) Inventors: Young-Sin Kim, Uiwang-si (KR); Kang-Yeol Park, Uiwang-si (KR); Young-Chul Kwon, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 13 days.

This patent is subject to a terminal disclaimer.

(21) Appl. No.: 14/437,058

(22) PCT Filed: Feb. 19, 2013

(86) PCT No.: PCT/KR2013/001291
§ 371 (c)(1),
(2) Date: Apr. 20, 2015

(87) PCT Pub. No.: WO2014/065472
PCT Pub. Date: May 1, 2014

(65) Prior Publication Data
US 2015/0283795 A1    Oct. 8, 2015

(30) Foreign Application Priority Data

Oct. 24, 2012  (KR) ........................ 10-2012-0118496

(51) Int. Cl.
*B29C 47/06*    (2006.01)
*B32B 27/08*    (2006.01)
(Continued)

(52) U.S. Cl.
CPC .......... *B32B 27/08* (2013.01); *B29C 47/0019* (2013.01); *B29C 47/065* (2013.01);
(Continued)

(58) Field of Classification Search
CPC ..... B32B 15/08; B32B 27/08; B32B 2509/10; B32B 2264/105; B32B 2264/0214;
(Continued)

(56) References Cited

U.S. PATENT DOCUMENTS 3,549,405 A   12/1970  Schrenk et al.
3,764,067 A   10/1973  Coffey et al.
(Continued)

FOREIGN PATENT DOCUMENTS

CN   1541830        11/2001
CN   1427910 A      5/2003
(Continued)

OTHER PUBLICATIONS

Garcia et al., "New Fluorinated Polymers Doped with BODIPY Chromophore as Highly Efficient and Photostable Optical Materials," Chem. Mater. 18, 601-602 (2006).*

(Continued)

*Primary Examiner* — Kregg T Brooks
(74) *Attorney, Agent, or Firm* — Additon, Higgins & Pendleton, P.A.

(57) ABSTRACT

A laminate sheet includes at least one base layer including a first thermoplastic resin; and at least one metallic resin layer disposed on one side or both sides of the base layer and including a second thermoplastic resin and a metal-resin composite particles, wherein the first thermoplastic resin and the second thermoplastic resin are the same or different from each other, the metal-resin composite particles includes a metal deposition layer, a first coating layer positioned on one side of the metal deposition layer, and a second coating layer (Continued)

positioned on the other side of the metal deposition layer, and each of the first coating layer and the second coating layer includes a thermosetting resin. A method of manufacturing the laminate sheet, an article using the laminate sheet and a method of manufacturing the article are also provided.

23 Claims, 3 Drawing Sheets

(51) Int. Cl.
| | |
|---|---|
| B32B 15/08 | (2006.01) |
| B32B 27/18 | (2006.01) |
| B32B 37/10 | (2006.01) |
| B32B 37/24 | (2006.01) |
| B29C 47/00 | (2006.01) |
| C08K 3/08 | (2006.01) |
| B32B 38/00 | (2006.01) |
| B29K 33/00 | (2006.01) |
| B29K 55/02 | (2006.01) |
| B29K 505/00 | (2006.01) |

(52) U.S. Cl.
CPC .............. *B32B 15/08* (2013.01); *B32B 27/18* (2013.01); *B32B 37/24* (2013.01); *B29K 2033/12* (2013.01); *B29K 2055/02* (2013.01); *B29K 2505/00* (2013.01); *B29K 2995/0026* (2013.01); *B32B 2038/0092* (2013.01); *B32B 2264/0214* (2013.01); *B32B 2264/105* (2013.01); *B32B 2264/12* (2013.01); *B32B 2307/406* (2013.01); *B32B 2307/412* (2013.01); *B32B 2307/414* (2013.01); *B32B 2329/06* (2013.01); *B32B 2509/10* (2013.01); *C08K 2003/0812* (2013.01); *Y10T 428/256* (2015.01)

(58) Field of Classification Search
CPC .............. B32B 27/18; B32B 2307/406; B32B 2329/06; C08K 9/10; C08K 2003/0812; C08L 29/14; C09D 129/14; C09J 129/14; B29C 47/0019; B29C 47/065
See application file for complete search history.

(56) References Cited

U.S. PATENT DOCUMENTS

| | | | |
|---|---|---|---|
| 3,932,348 A | | 1/1976 | Camelon et al. |
| 3,932,349 A | * | 1/1976 | Camelon ............ C09D 5/38 427/195 |
| 4,544,600 A | | 10/1985 | Kern |
| 4,621,112 A | | 11/1986 | Backhouse et al. |
| 4,892,779 A | | 1/1990 | Leatherman et al. |
| 5,010,112 A | | 4/1991 | Glicksman et al. |
| 5,332,767 A | | 7/1994 | Reisser et al. |
| 5,334,657 A | * | 8/1994 | Swartzmiller .......... B32B 27/08 525/240 |
| 6,428,875 B1 | | 8/2002 | Takahashi et al. |
| 6,933,044 B2 | | 8/2005 | Ishikawa |
| 7,052,769 B2 | | 5/2006 | Hase et al. |
| 7,485,365 B2 | | 2/2009 | Schuster et al. |
| 7,553,887 B2 | | 6/2009 | Sugimoto et al. |
| 7,820,279 B2 | | 10/2010 | Hiraoka et al. |
| 7,923,099 B2 | | 4/2011 | Park |
| 8,007,902 B2 | * | 8/2011 | Smith ............ B29C 47/065 264/173.16 |
| 8,642,681 B2 | | 2/2014 | Setoguchi |
| 8,946,337 B2 | | 2/2015 | Lee et al. |
| 2002/0013398 A1 | | 1/2002 | Ido et al. |
| 2005/0042437 A1 | | 2/2005 | Ramesh et al. |
| 2005/0104214 A1 | | 5/2005 | Maeda et al. |
| 2006/0017193 A1 | | 1/2006 | Asthana et al. |
| 2006/0046057 A1 | | 3/2006 | Huber et al. |
| 2006/0105663 A1 | | 5/2006 | Greulich et al. |
| 2006/0167147 A1 | | 7/2006 | Asgari |
| 2007/0276083 A1 | | 11/2007 | Higashi et al. |
| 2008/0281029 A1 | | 11/2008 | Morvan et al. |
| 2010/0289187 A1 | | 11/2010 | Bae et al. |
| 2012/0065298 A1 | | 3/2012 | Setoguchi |
| 2012/0129992 A1 | | 5/2012 | Kang et al. |
| 2012/0264869 A1 | | 10/2012 | Lee et al. |
| 2012/0270988 A1 | | 10/2012 | Lee et al. |
| 2014/0066563 A1 | | 3/2014 | Kim et al. |
| 2014/0072795 A1 | | 3/2014 | Kim et al. |
| 2015/0353736 A1 | | 12/2015 | Kim et al. |
| 2015/0376396 A1 | | 12/2015 | Lee et al. |

FOREIGN PATENT DOCUMENTS

| | | |
|---|---|---|
| CN | 1427910 A | 7/2003 |
| CN | 1764698 A | 7/2003 |
| CN | 1495227 | 5/2004 |
| CN | 1616223 | 5/2005 |
| CN | 1692017 | 11/2005 |
| CN | 1750926 | 3/2006 |
| CN | 1764698 A | 4/2006 |
| CN | 101796110 A | 8/2010 |
| EP | 0801335 A1 | 10/1997 |
| EP | 1306483 A1 | 5/2003 |
| EP | 1721939 A1 | 11/2006 |
| EP | 1306483 A1 | 3/2009 |
| JP | 06-285948 | 10/1994 |
| JP | 06-044687 | 11/1994 |
| JP | 07-118561 A | 5/1995 |
| JP | 07-156299 A | 6/1995 |
| JP | 08-074037 | 3/1996 |
| JP | 09-165487 A | 6/1997 |
| JP | 10-000735 | 1/1998 |
| JP | 10-017674 A | 1/1998 |
| JP | 10-182873 A | 7/1998 |
| JP | 11-010791 A | 1/1999 |
| JP | 2001-181515 A | 7/2001 |
| JP | 2001-250992 | 9/2001 |
| JP | 2001-262003 | 9/2001 |
| JP | 2002-127328 | 5/2002 |
| JP | 2003-019777 | 1/2003 |
| JP | 2003-103733 | 4/2003 |
| JP | 2004-066500 A | 3/2004 |
| JP | 2004-066550 A | 3/2004 |
| JP | 2004-083608 A | 3/2004 |
| JP | 2004-346194 A | 12/2004 |
| JP | 2005-123735 | 5/2005 |
| JP | 3697452 | 8/2005 |
| JP | 2007-118350 A | 5/2007 |
| JP | 2007-137963 | 6/2007 |
| JP | 2007-190702 A | 8/2007 |
| JP | 2007-326314 A | 12/2007 |
| JP | 2009-035713 A | 2/2009 |
| JP | 2009-046679 | 3/2009 |
| JP | 10-2010-0079612 A | 7/2010 |
| JP | 2010-201669 | 9/2010 |
| JP | 2011-026537 A | 2/2011 |
| JP | 2011-094056 | 5/2011 |
| JP | 2011-143584 | 7/2011 |
| JP | 2011-183577 | 9/2011 |
| KR | 10-0227586 | 1/1999 |
| KR | 10-2001-0033813 A | 4/2001 |
| KR | 10-2003-0035897 A | 5/2003 |
| KR | 10-0413082 | 12/2003 |
| KR | 10-2006-0031692 A | 4/2006 |
| KR | 10-2006-0078530 A | 7/2006 |
| KR | 10-2006-0106623 A | 10/2006 |
| KR | 10-0690898 B1 | 2/2007 |
| KR | 10-2007-0025229 A | 3/2007 |
| KR | 10-0693064 | 3/2007 |
| KR | 10-2007-0102717 A | 10/2007 |
| KR | 10-2009-0066577 A | 6/2009 |
| KR | 10-2010-0123421 | 11/2010 |
| KR | 10-1000290 | 12/2010 |
| KR | 10-2011-0008598 A | 1/2011 |
| KR | 10-2011-0057415 A | 1/2011 |

(56) References Cited

FOREIGN PATENT DOCUMENTS

| KR | 10-2011-0079465 A | 7/2011 |
|---|---|---|
| KR | 10-2011-0079466 A | 7/2011 |
| KR | 10-2011-0107034 A | 9/2011 |
| KR | 10-2012-0027280 | 3/2012 |
| KR | 10-2012-027280 A | 3/2012 |
| KR | 10-2014-0032301 A | 3/2014 |
| TW | 200621902 | 7/2006 |
| WO | 2006/041658 A1 | 4/2006 |
| WO | 2009/029095 A1 | 3/2009 |
| WO | 2014/065472 A1 | 5/2014 |
| WO | 2014/104490 A1 | 7/2014 |
| WO | 2014/129712 A1 | 8/2014 |

OTHER PUBLICATIONS

Search Report in counterpart Chinese Application No. 201380067877.6 dated Jan. 6, 2016, pp. 1-2.
International Search Report and Written Opinion in counterpart International Application No. PCT/KR2013/001291, dated Jun. 10, 2013, pp. 1-6.
International Search Report in commonly owned International Application No. PCT/KR2013/003794 dated Sep. 4, 2013, pp. 1-4.
International Search Report and Written Opinion in commonly owned International Application No. PCT/KR2013/003794 dated Sep. 24, 2013, pp. 1-10.
Search Report in commonly owned Chinese Application No. 201380069442.5 dated Mar. 15, 2016, pp. 1-3.
Office Action in commonly owned U.S. Appl. No. 14/655,444 dated Nov. 18, 2016, pp. 1-5.
Extended European Search Report in commonly owned European Application No. 13183216.4 dated Mar. 28, 2014, pp. 1-6.
Search Report in commonly owned Chinese Application No. 2013104044803 dated Mar. 26, 2015, pp. 1-3.
Search Report in commonly owned Chinese Application No. 2013104036417 dated Mar. 8, 2015, pp. 1-2.
European Search Report in commonly owned European Application No. 13183218.0 dated Nov. 26, 2013, 1-5 pp.
Office Action in commonly owned U.S. Appl. No. 13/872,250 dated Nov. 4, 2014, pp. 1-16.
Final Office Action in commonly owned U.S. Appl. No. 13/872,250 dated Apr. 3, 2015, pp. 1-17.
Office Action in commonly owned U.S. Appl. No. 13/872,250 dated Dec. 3, 2015, pp. 1-22.
Final Office Action in commonly owned U.S. Appl. No. 13/872,250 dated May 3, 2016, pp. 1-21.
Office Action in commonly owned U.S. Appl. No. 13/872,260 dated Sep. 10, 2014, pp. 1-11.
Final Office Action in commonly owned U.S. Appl. No. 13/872,260 dated Apr. 22, 2015, pp. 1-7.
Advisory Action in commonly owned U.S. Appl. No. 13/872,260 dated Jul. 14, 2015, pp. 1-4.
Notice of Allowance in commonly owned U.S. Appl. No. 13/872,260 dated Sep. 28, 2015, pp. 1-5.
International Search Report and Written Opinion in commonly owned International Application No. PCT/KR2013/007904 dated Nov. 26, 2013, pp. 1-7.
Search Report in commonly owned Chinese Application No. 201380073664.4 dated Jul. 26, 2016, pp. 1-2.
European Search Report in commonly owned European Application No. 13183218.0 dated Nov. 26, 2013, pp. 1-5.
Office Action in commonly owned U.S. Appl. No. 14/769,267 dated Jan. 15, 2016, pp. 1-13.
Notice of Allowance in commonly owned U.S. Appl. No. 14/769,267 dated Aug. 16, 2016, pp. 1-5.
Advisory Action in commonly owned U.S. Appl. No. 13/872,250 dated Jul. 15, 2016, pp. 1-7.
Notice of Allowance in commonly owned U.S. Appl. No. 14/769,267 dated Dec. 19, 2016, pp. 1-5.
Office Action in commonly owned U.S. Appl. No. 13/872,250 dated Mar. 22, 2017, pp. 1-19.

\* cited by examiner

[FIG. 1]
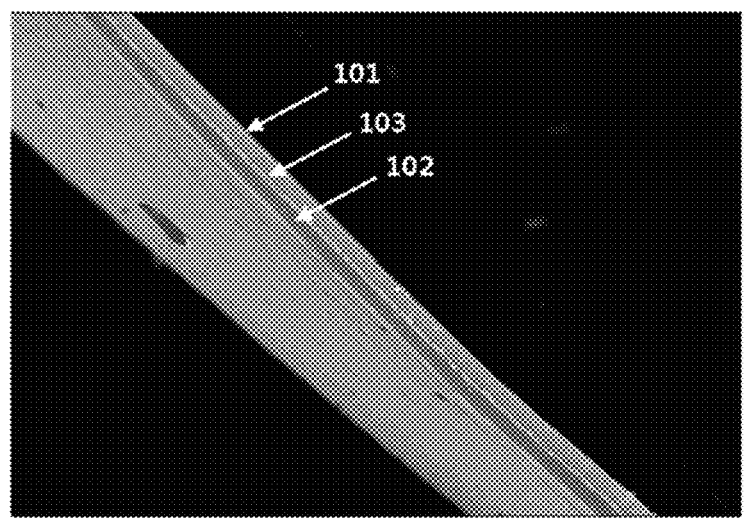
[FIG. 2]
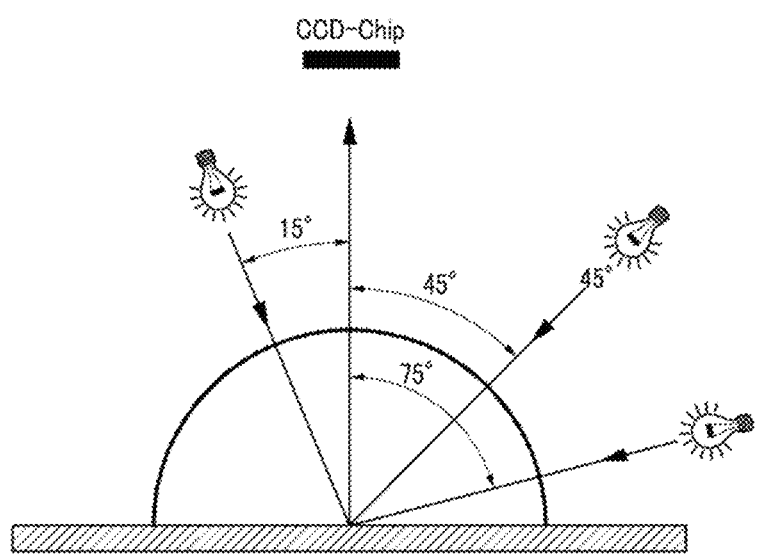

[FIG. 3]
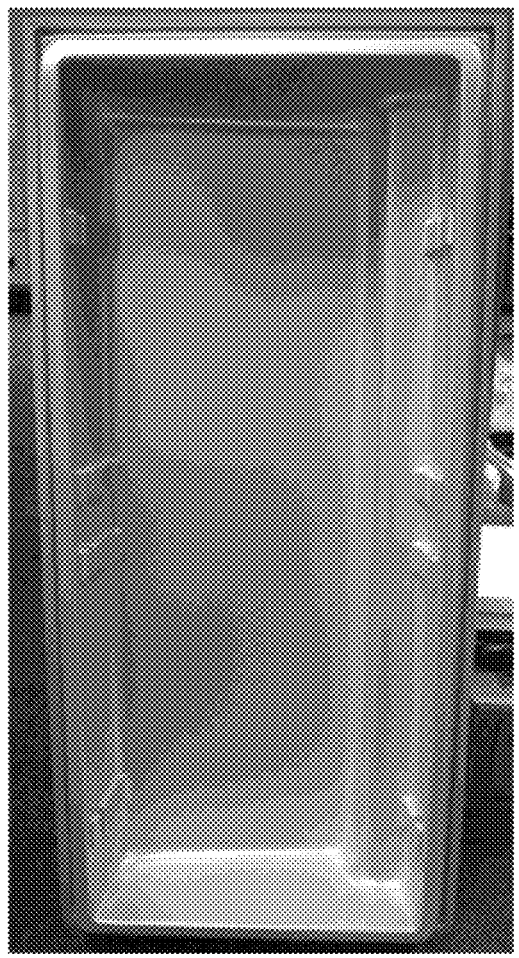

[FIG. 4A]
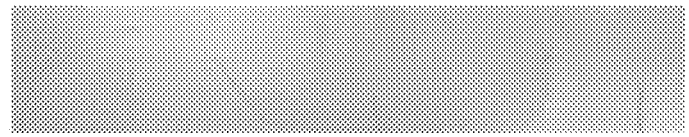
[FIG. 4B]
[FIG. 4C]
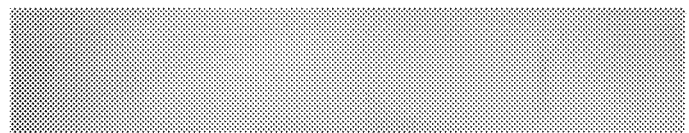
[FIG. 4D]
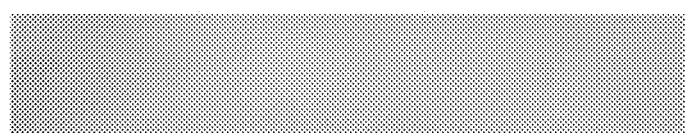

LAMINATE SHEET, METHOD OF MANUFACTURING THE LAMINATE SHEET, AND ARTICLE USING THE LAMINATE SHEET

CROSS-REFERENCE TO RELATED APPLICATIONS

This application claims priority to and the benefit of International Application No. PCT/KR2013/001291, filed Feb. 19, 2013, which published as WO 2014/065472 on May 1, 2014, and Korean Patent Application No. 10-2012-0118496, filed in the Korean Intellectual Property Office on Oct. 24, 2012, the entire disclosure of each of which is incorporated herein by reference.

TECHNICAL FIELD

A laminate sheet, a method of manufacturing the laminate sheet, and an article using the laminate sheet are disclosed.

BACKGROUND ART

Recently, plastic exterior products having diverse colors are winning popularity for electronic parts, automobile parts and the like, and plastic exterior products with high quality sense of touch.

The plastic exterior products usually include a plastic resin and a metal particle and give metal-like texture to the resin appearance. This is disclosed in Japanese Patent Laid-Open Publication Nos. 2001-262003 and 2007-137963.

Japanese Patent Laid-Open Publication No. 2001-262003 discloses a use of a flake-shaped metal particulate, and Japanese Patent Laid-Open Publication No. 2007-137963 discloses resin composition including a glass fiber and a metal particle.

Accordingly, a conventional article formed by adding a metal particle and the like to a plastic resin may realize only a metal-mixing texture but a metal-like texture and thus, be unable to replace a painted article.

DISCLOSURE

Technical Problem

One embodiment provides a laminate sheet having a metal-like texture near to that of a painted article while not being painted and excellent luminance, a method of manufacturing the laminate sheet, and an article using the laminate sheet.

Technical Solution

One embodiment provides a laminate sheet. The laminate sheet includes at least one base layer including a first thermoplastic resin; and at least one metallic resin layer disposed on one side or both sides of the base layer and including a second thermoplastic resin and a metal-resin composite particle, wherein the first thermoplastic resin and the second thermoplastic resin are the same or different from each other, the metal-resin composite particle includes a metal deposition layer, a first coating layer positioned on one side of the metal deposition layer, and a second coating layer positioned on the other side of the metal deposition layer, and each of the first coating layer and the second coating layer includes a thermosetting resin.

The metal deposition layer may be an aluminum deposition layer.

The metal deposition layer may have a thickness of 0.01 to 1.0 µm.

The thermosetting resin may include a phenolic resin, an epoxy resin, an unsaturated polyester resin, an urethane resin, an urea resin, a melamine resin, an alkyd resin, a silicone resin, or a combination thereof.

The thermosetting resin may have a refractive index of 1.45 to 1.55.

Each of the first coating layer and the second coating layer may be transparent or translucent.

The metal-resin composite particle may further include a thermoplastic resin layer, and the thermoplastic resin layer may be positioned on at least one of the external surfaces of the first and second coating layers.

The metal-resin composite particle may have a thickness of 1.01 to 100 µm.

The metal-resin composite particle may have an average particle diameter of 2 to 2,000 µm.

The metal-resin composite particle may be included in an amount of 0.5 to 5.0 parts by weight based on 100 parts by weight of the second thermoplastic resin.

The first thermoplastic resin and the second thermoplastic resin may be the same or different from each other, and independently include a polycarbonate resin, a rubber modified vinyl-based copolymer resin, a polyester resin, a polyalkyl(meth)acrylate resin, a styrene-based polymer, a polyolefin resin, or a combination thereof.

The second thermoplastic resin may have a refractive index of 1.45 to 1.55.

The second thermoplastic resin may be transparent or translucent.

The laminate sheet may further include a skin layer, the skin layer may include a third thermoplastic resin, may be transparent or translucent, and may be positioned on the external surface of the metallic resin layer.

In another embodiment, a method of manufacturing a laminate sheet is provided. The manufacturing method may include coextruding at least one composition for forming a base layer and at least one composition for forming a metallic resin layer. The composition for forming a base layer may include a first thermoplastic resin, the composition for forming a metallic resin layer may include a second thermoplastic resin and a metal-resin composite particle, the first thermoplastic resin and the second thermoplastic resin may be the same or different from each other, the metal-resin composite particle includes a metal deposition layer, a first coating layer positioned on one side of the metal deposition layer, and a second coating layer positioned on the other side of the metal deposition layer, and each of the first coating layer and the second coating layer may include a thermosetting resin.

The metal deposition layer may be an aluminum deposition layer.

The thermosetting resin may include a phenolic resin, an epoxy resin, an unsaturated polyester resin, an urethane resin, an urea resin, a melamine resin, an alkyd resin, a silicone resin, or a combination thereof.

The metal-resin composite particle may be included in an amount of 0.5 to 5.0 parts by weight based on 100 parts by weight of the second thermoplastic resin.

The first thermoplastic resin and the second thermoplastic resin may be the same or different from each other, and independently include a polycarbonate resin, a rubber modified vinyl-based copolymer resin, a polyester resin, a polyalkyl(meth)acrylate resin, a styrene-based polymer, a polyolefin resin, or a combination thereof.

The coextruding may include coextruding the at least one composition for forming a base layer, the at least one composition for forming a metallic resin layer, and at least one composition for forming a skin layer, wherein the composition for forming a skin layer may include a third thermoplastic resin and may be transparent or translucent, and the skin layer may be positioned on the external surface of the metallic resin layer in the manufactured laminate sheet.

In yet another embodiment, an article manufactured using the laminate sheet is provided.

The article may be manufactured by vacuum-molding the laminate sheet.

The article may be a refrigerator inner liner.

The article may have a flop index of 11 to 25, a sparkle intensity of 8 to 20, and luminance of 70 to 100% measured based on a gloss level at an angle of 60°.

Advantageous Effects

The laminate sheet manufactured according to one embodiment, the laminate sheet manufactured according to the manufacturing method of one embodiment, the article according to one embodiment, and the article manufactured according to the manufacturing method of one embodiment may have a similar metal-like texture to that of a painted article while not being painted and excellent luminance.

BRIEF DESCRIPTION OF THE DRAWINGS

FIG. 1 is a scanning electron microscope (SEM) photograph showing one side of a metal-resin composite particle according to one embodiment.

FIG. 2 is a schematic view showing a method of measuring a metal particle texture of one embodiment.

FIG. 3 is a photograph showing an article according to one embodiment.

FIGS. 4A, 4B, 4C, and 4D are reference photographs for evaluating the appearance of the articles of the Examples and Comparative Examples with regard to flow mark or weld line, wherein FIG. 4A depicts an article with a different color of greater than or equal to 70% to less than or equal to 100% in the flow mark or weld line; FIG. 4B depicts an article with a different color of greater than or equal to 50% to less than or equal to 70% in the flow mark or weld line flow mark; FIG. 4C depicts an article with a different color of greater than or equal to 10% to less than or equal to 50% in the flow mark or weld line flow mark; and FIG. 4D depicts an article with a different color of less than or equal to 10% in the flow mark or weld line flow mark.

BEST MODE

Hereinafter, embodiments are described in detail. However, the embodiments are exemplary and do not limit one embodiment and one embodiment may be defined by the scope of the following claims.

In the present specification, when specific definition is not otherwise provided, "(meth)acrylate" refers to both "acrylate" and "methacrylate". "(Meth)acrylic acid alkyl ester" refers to both "acrylic acid alkyl ester" and "methacrylic acid alkyl ester", and "(meth)acrylic acid ester" refers to both "acrylic acid ester" and "methacrylic acid ester".

In the present specification, when specific definition is not otherwise provided, "copolymerization" may refer to block copolymerization, random copolymerization, graft copolymerization, or alternate copolymerization, and "copolymer" may refer to a block copolymer, a random copolymer, a graft copolymer, or an alternate copolymer.

In the present specification, when specific definition is not otherwise provided, the average particle diameter and thickness of an article are respectively obtained by sampling a part of the article and measuring particle diameters and thicknesses of greater than or equal to 50 particles and calculating arithmetic means of the particle diameter and thickness measurements of the rest of the particles except for top 10% and bottom 10 of the particles based on the SEM image through an analysis of the cross section of the article based on a scanning electron microscope (SEM, S4800, Hitachi Inc.).

In one embodiment, a laminate sheet includes at least one base layer including a first thermoplastic resin; and at least one metallic resin layer disposed on one side or both sides of the base layer and including a second thermoplastic resin and a metal-resin composite particle. The first thermoplastic resin and the second thermoplastic resin may be the same or different from each other, the metal-resin composite particle includes a metal deposition layer 103, a first coating layer positioned on one side of the metal deposition layer 101 and a second coating layer positioned on the other side of the metal deposition layer 102, and each of the first coating layer and the second coating layer includes a thermosetting resin.

The laminate sheet may be manufactured through coextrusion. Specifically, the laminate sheet may be manufactured by coextruding at least one composition for forming a base layer and at least one composition for forming a metallic resin layer.

When the laminate sheet is manufactured through coextrusion, a flow mark and a weld line that may be generated during an injection molding are not generated at all, and thus, appearance characteristics of the laminate sheet are remarkably improved.

The laminate sheet may have a multi-layer structure having greater than or equal to two layers.

The base layer may be a monolayer or a multi-layer having greater than or equal to two layers.

In another embodiment, an article manufactured using the laminate sheet is provided.

First Thermoplastic Resin

The first thermoplastic resin may be any generally-used thermoplastic resin in the field of one embodiment without limitation.

The first thermoplastic resin may include a polycarbonate resin, a rubber modified vinyl-based copolymer resin, a polyester resin, a polyalkyl(meth)acrylate resin, a styrene-based polymer, a polyolefin resin, or a combination thereof.

The first thermoplastic resin may be transparent, translucent, or opaque.

The first thermoplastic resin may provide basic properties such as impact resistance, heat resistance, flexural characteristics, tensile characteristics, and the like, to the laminate sheet.

The polycarbonate resin may be prepared by reacting diphenols with a compound of a phosgene, halogen formate, carbonate ester, or a combination thereof.

Examples of the diphenols include hydroquinone, resorcinol, 4,4'-dihydroxydiphenyl, 2,2-bis(4-hydroxyphenyl)propane ('bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis (3,5-dimethyl-4-hydroxyphenyl)propane, 2,2-bis(3,5-dichloro-4- hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Of the diphenols, 2,2-bis(4-hydroxyphenyl) propane, 2,2-bis(3,5-dichloro-4-hydroxyphenyl)propane, or 1,1-bis(4-hydroxyphenyl)cyclohexane may be preferably used, and 2,2-bis(4-hydroxyphenyl)propane may be more preferably used.

The polycarbonate resin may have a weight average molecular weight of 10,000 g/mol to 200,000 g/mol, and specifically 15,000 g/mol to 80,000 g/mol, without limitation.

The polycarbonate resin may be a mixture of copolymers obtained using two or more dipenols that differ from each other. The polycarbonate resin may include a linear polycarbonate resin, a branched polycarbonate resin, a polyestercarbonate copolymer resin, and the like.

The linear polycarbonate resin may include a bisphenol-A-based polycarbonate resin. The branched polycarbonate resin may be produced by reacting a multi-functional aromatic compound such as trimellitic anhydride, trimellitic acid, and the like, with diphenols and a carbonate. The multi-functional aromatic compound may be included in an amount of 0.05 to 2.0 mol % based on the total amount of the branched polycarbonate resin. The polyester carbonate copolymer resin may be produced by reacting difunctional carboxylic acid with diphenols and a carbonate. The carbonate may include a diaryl carbonate such as diphenyl carbonate, ethylene carbonate, and the like.

The rubber modified vinyl-based graft copolymer resin is a copolymer where 5 to 95 wt % of a vinyl-based polymer is grafted on 5 to 95 wt % of a rubbery polymer.

The rubbery polymer may include a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM) rubber, a polyorganosiloxane/polyalkyl(meth)acrylate rubber composite, or a combination thereof.

The vinyl-based polymer may be a polymer of 50 to 95 wt % of a first vinyl-based monomer of an aromatic vinyl monomer, an acryl-based monomer, a heterocyclic monomer, or a combination thereof; and 5 to 50 wt % of a second vinyl-based monomer of an unsaturated nitrile monomer, an acryl-based monomer, a heterocyclic monomer, or a combination thereof.

The aromatic vinyl monomer may be styrene, C1 to C10 alkyl-substituted styrene, halogen-substituted styrene, or a combination thereof. The alkyl-substituted styrene may include o-ethyl styrene, m-ethyl styrene, p-ethyl styrene, α-methyl styrene, and the like.

The acryl-based monomer may include (meth)acrylic acid alkyl ester, (meth)acrylic acid ester, or a combination thereof. Herein, the alkyl may be a C1 to C10 alkyl. The (meth)acrylic acid alkyl ester may include methyl(meth)acrylate, ethyl(meth)acrylate, propyl(meth)acrylate, butyl(meth)acrylate, and the like, and among them, methyl(meth)acrylate may be preferable. Examples of the (meth)acrylic acid ester may be (meth)acrylate, and the like.

The heterocyclic monomer may be maleic anhydride, alkyl- or phenyl N-substituted maleimide, or a combination thereof.

The unsaturated nitrile monomer may include acrylonitrile, methacrylonitrile, ethacrylonitrile, or a combination thereof.

When the rubber modified vinyl-based graft copolymer resin is prepared, a rubber particle may have a particle diameter of 0.1 to 1 μm in order to improve the impact resistance of the resin and surface characteristics of an article using the same, and when the rubbery polymer particle has an average particle diameter of 0.1 to 1.0 μm, excellent impact strength may be ensured.

The rubber modified vinyl-based graft copolymer resin may be used singularly or as a mixture of two or more.

Examples of the rubber modified vinyl-based copolymer resin may be resin including a copolymer that styrene, acrylonitrile, and optionally methyl(meth)acrylate are graft-copolymerized on a butadiene rubber, an acrylic rubber, or a styrene/butadiene rubber.

Specific examples of the rubber modified vinyl-based graft copolymer resin may be resin including a copolymer where methyl(meth)acrylate is graft-copolymerized to a butadiene rubber, an acrylic rubber or a styrene/butadiene rubber.

The method of preparing the rubber modified vinyl-based copolymer resin is widely known to a person skilled in the art, and may be an emulsion polymerization, suspension polymerization, solution polymerization, or massive polymerization method.

The polyester resin is an aromatic polyester resin, and it may be a condensation-polymerized resin obtained from melt polymerization of terephthalic acid or alkylester terephthalate, and a C2 to C10 glycol component. Herein, the alkyl may be a C1 to C10 alkyl.

Examples of the aromatic polyester resin may include a polyethylene terephthalate resin, a polytrimethylene terephthalate resin, a polybutylene terephthalate resin, a polyhexamethylene terephthalate resin, a polycyclohexane dimethylene terephthalate resin, or a polyester resin modified into a non-crystalline resin by mixing the resins with another monomer, and among them, a polyethylene terephthalate resin, a polytrimethylene terephthalate resin, a polybutylene terephthalate resin, and non-crystalline polyethylene terephthalate resin may be preferably used, and a polybutylene terephthalate resin and polyethylene terephthalate resin may be more preferably used.

The polyethylene terephthalate resin is a condensation-polymerized polymer obtained through a direct ester reaction or an ester exchange reaction of ethylene glycol monomer, and terephthalic acid or dimethyl terephthalate monomer.

Also, in order to increase the impact strength of the polyethylene terephthalate resin, the polyethylene terephthalate resin may be copolymerized with copolytetramethylene glycol (PTMG), polyethylene glycol (PEG), polypropylene glycol (PPG), a low molecular-weight aliphatic polyester or aliphatic polyamide, and may be used in the form of a modified polyethylene terephthalate resin obtained by blending with a component improving an impact strength.

The polyalkyl(meth)acrylate resin may be obtained by polymerizing a raw monomer including an alkyl(meth)acrylate through a known polymerization method, such as a suspension polymerization method, a massive polymerization method, an emulsion method and the like.

The alkyl(meth)acrylate may have a substituted or unsubstituted C1 to C10 alkyl group, and may include methyl(meth)acrylate, ethyl(meth)acrylate, butyl(meth)acrylate, glycidyl(meth)acrylate, hydroxyethyl(meth)acrylate, and the like.

The polyalkyl(meth)acrylate may have a weight average molecular weight of 10,000 to 200,000 g/mol, and specifically 15,000 to 150,000 g/mol. When the polyalkyl(meth)acrylate has a weight average molecular weight within the above range, hydrolysis resistance, scratch resistance, workability, and the like, may be improved.

The styrene-based polymer may be a polymer including 20 to 100 wt % of a styrene-based monomer; and 0 to 80 wt % of a vinyl-based monomer selected from an acryl-based monomer, a heterocyclic monomer, an unsaturated nitrile monomer, or a combination thereof. The styrene-based polymer may be for example a rubber modified styrene-based polymer such as a rubber-reinforced polystyrene resin (HIPS).

The styrene-based monomer may be styrene, C1 to C10 alkyl-substituted styrene, halogen-substituted styrene, or a combination thereof. The alkyl-substituted styrene may include o-ethyl styrene, m-ethyl styrene, p-ethyl styrene, α-methyl styrene, and the like.

The acryl-based monomer may include (meth)acrylic acid alkyl ester, (meth)acrylic acid ester, or a combination thereof. Herein, the alkyl may be a C1 to C10 alkyl. The (meth)acrylic acid alkyl ester may include methyl(meth)acrylate, ethyl(meth)acrylate, propyl(meth)acrylate, butyl(meth)acrylate, and the like, and among them, methyl(meth)acrylate may be preferable. Examples of the (meth)acrylic acid ester may be (meth)acrylate, and the like.

The heterocyclic monomer may be maleic anhydride, alkyl- or phenyl N-substituted maleimide, or a combination thereof.

The unsaturated nitrile monomer may include acrylonitrile, methacrylonitrile, ethacrylonitrile, or a combination thereof.

Specific examples of the styrene-based polymer may be selected from a copolymer of a styrene-based monomer and an unsaturated nitrile monomer, a copolymer of a styrene-based monomer and an acryl-based monomer, a copolymer of a styrene-based monomer, an unsaturated nitrile monomer, and an acryl-based monomer, a styrene-based homopolymer of a styrene-based monomer, and a combination thereof.

The styrene-based polymer may have a weight average molecular weight of 40,000 to 500,000 g/mol.

The styrene-based polymer may be prepared using emulsion polymerization, suspension polymerization, solution polymerization, massive polymerization, and the like.

The polyolefin resin may be a polyethylene resin (PE), a polypropylene resin (PP) or a copolymer thereof.

The thermoplastic resin may be an alloy including two or more kinds of resins.

Metal-Resin Composite Particle

The metal-resin composite particle includes a metal deposition layer having high smoothness and thus, may realize high luminance and excellent metal-like texture. The laminate sheet including the metallic resin layer including such a metal-resin composite particle and an article using the same may realize similar metal-like texture and luminance to those of a painted article while not being painted.

The metal deposition layer may be an aluminum deposition layer. Accordingly, the article including the aluminum deposition layer may have an excellent metal-like texture, which may be similar to a silver gloss.

The metal deposition layer may have a thickness of 0.01 to 1.0 μm, specifically 0.01 to 0.9 μm, 0.01 to 0.8 μm, 0.01 to 0.7 μm, 0.01 to 0.6 μm, 0.01 to 0.5 μm, 0.05 to 1.0 μm, 0.1 to 1.0 μm, 0.2 to 1.0 μm, 0.3 to 1.0 μm, or 0.4 to 1.0 μm.

The metal deposition layer may be thinner than conventional metal particles prepared by grinding a metal foil and the like.

When the metal deposition layer has a thickness within the range, a metal-resin composite particle having the metal deposition layer may have very excellent smoothness. The laminate sheet including the metallic resin layer including such a metal-resin composite particle and the article using the same may have similar metal-like texture to that of a painted article while not being painted and also, very excellent luminance.

The metal-resin composite particle includes the first and second coating layers and may be uniformly dispersed in the metallic resin layer.

Each of the first and second coating layers includes a thermosetting resin. Herein, when the metal-resin composite particle is melt/knead with the second thermoplastic resin at a high process temperature, the first coating layer and the second coating layer are not melt nor separated but cause a chemical reaction with the second thermoplastic resin. Accordingly, the metal-resin composite particle is not modified but maintains a shape and property at a high process temperature.

The thermosetting resin may include a phenolic resin, an epoxy resin, an unsaturated polyester resin, an urethane resin, an urea resin, a melamine resin, an alkyd resin, a silicone resin, or a combination thereof.

At least one of the first and second coating layers may further include an additive, and the additive may include polyvinyl butyral (PVB).

When at least one of the first and second coating layers further includes the additive, adherence between the metal deposition layer and the first coating layers or between the metal deposition layer and the second coating layer are improved. In addition, transparency of the first coating layer or the second coating layer is improved, and luminance and the like of the metal-resin composite particle is also improved. Furthermore, the laminate sheet including the metallic resin layer including such a metal-resin composite particle and the article using the same has very excellent luminance, and the metal-resin composite particle is well dispersed in the metallic resin layer of the laminate sheet.

The thermosetting resin in the first coating layer and the second coating layer may have a refractive index of 1.45 to 1.55.

When the thermosetting resin included in the first and second coating layers has a refractive index within the range, the laminate sheet including the metallic resin layer including such a metal-resin composite particle and the article using the same has very excellent metal-like texture and luminance.

In particular, when the thermosetting resin included in the first coating layer, the thermosetting resin included in the second coating layer, and the second thermoplastic resin have a similar refractive index to each other, the laminate sheet and the article using the same may have similar metal-like texture to that of a painted one while not being painted and has very excellent luminance.

The first and second coating layers may have each thickness that is the same or different from each other and independently ranges from 0.5 to 10 μm, and specifically, 0.5 to 9 μm, 0.5 to 8 μm, 0.5 to 7 μm, 0.5 to 6 μm, 0.5 to 5 μm, 1 to 10 μm, 2 to 10 μm, 3 to 10 μm, 4 to 10 μm.

When the first and second coating layers have a thickness within the range, the metal-resin composite particle has very excellent smoothness. The laminate sheet including the metallic resin layer including such a metal-resin composite particle and the article using the same may have a similar metal-like texture to that of a painted one while not being painted and very excellent luminance.

Each of the first coating layer and second coating layer may be transparent or translucent. That is, the first coating layer and second coating layer may have a haze that may be the same or different from each other, and may have independently a haze of 0.5 to 40%. Specifically, it may be 0.5 to 35%, 0.5 to 30%, 0.5 to 25%, 0.5 to 20%, or 0.5 to 15%.

The transparency of the first and second coating layers indicates that the layers transmit all the incident lights, and the translucence thereof indicates that the layers partially transmit all the incident lights.

The haze indicates a degree of opaqueness or cloudiness.

The haze is calculated according to the following equation 1 in the present specification.

Haze (%)={diffused light/(diffused and transmitted light+parallel transmitted light)}×100    [Calculation Equation 1]

When the first and second coating layers are transparent or translucent, that is, the first and second coating layers have a haze within the range, the metal-resin composite particle may realize high luminance and excellent metal-like texture. The laminate sheet including the metallic resin layer including such a metal-resin composite particle and the article may have a similar metal-like texture and luminance to that of a painted one while not being painted.

The metal-resin composite particle may have a multi-layer structure.

The metal-resin composite particle may have a sandwich laminated structure.

The metal-resin composite particle may have a multi-layer structure having three or more layers.

The metal-resin composite particle may further include at least one thermoplastic resin layer.

The thermoplastic resin layer may be positioned on at least one selected from the external surfaces of the first and second coating layers.

When the metal-resin composite particle further include the thermoplastic resin layer, the first and/or second coating layer may be more uniformly thick, and the metal deposition layer may be more improved flat. Accordingly, the metal-resin composite particle may have very excellent smoothness.

The thermoplastic resin layer may include a polycarbonate resin, a rubber modified vinyl-based copolymer resin, a polyester resin, a polyalkyl(meth)acrylate resin, a styrene-based polymer, a polyolefin resin, or a combination thereof.

The thermoplastic resin layer may include a different material from the first coating layer. The thermoplastic resin layer may also include a different material from the second coating layer.

The metal-resin composite particle may have a thickness of 1.01 to 100 µm. Specifically, it may be 1.01 to 90 µm, 1.01 to 80 µm, 1.01 to 70 µm, 1.01 to 60 µm, 1.01 to 50 µm, 2.0 to 100 µm, 3.0 to 100 µm, 4.0 to 100 µm, 5.0 to 100 µm, 10 to 100 µm, 20 to 100 µm, 30 to 100 µm, or 40 to 100 µm.

When the metal-resin composite particle has a thickness within the range, the metal-resin composite particle may realize high luminance and excellent metal-like texture. The laminate sheet including the metallic resin layer including such a metal-resin composite particle and using the same article may have a similar metal-like texture to that of a painted one while not being painted, and may have very excellent luminance.

The metal-resin composite particle may have an average particle diameter of 2 to 2,000 µm. Specifically, it may be 2 to 1,500 µm, 2 to 1,000 µm, 2 to 900 µm, 2 to 800 µm, 2 to 700 µm, 2 to 600 µm, 2 to 500 µm, 10 to 1,000 µm, 20 to 1,000 µm, 30 to 1,000 µm, 40 to 1,000 µm, or 50 to 1,000 µm.

When the metal-resin composite particle has an average particle diameter within the range, the metal-resin composite particle may realize high luminance and excellent metal-like texture. The laminate sheet including the metallic resin layer including such a metal-resin composite particle and using the same article may have similar metal-like texture to that of a painted one while not being painted, and may have very excellent luminance.

In addition, when the metal-resin composite particle has an average particle diameter within the range, the metal-resin composite particle is uniformly dispersed in the metallic resin layer of the laminate sheet and thus, improves metal-like texture and luminance of the article.

The metal-resin composite particle may be included in an amount of 0.5 to 5.0 parts by weight based on 100 parts by weight of the second thermoplastic resin.

Specifically, it may be 0.5 to 4.5 parts by weight, 0.5 to 4.0 parts by weight, 0.5 to 3.5 parts by weight, 0.5 to 3.0 parts by weight, 0.5 to 2.5 parts by weight, 1.0 to 5.0 parts by weight, 1.5 to 5.0 parts by weight, 2.0 to 5.0 parts by weight, or 2.5 to 5.0 parts by weight.

When the metal-resin composite particle has an average particle diameter within the range, the laminate sheet including the metallic resin layer including such a metal-resin composite particle and the article using the same may have a similar metal-like texture to that of a painted one while not being painted, and very excellent luminance.

The metal-resin composite particle may be dispersed in the metallic resin layer, uniformly.

In general, since metal particles have a higher density than a thermoplastic resin, the metal particles are densely distributed in a center layer with a reference to cross section of the article, when an article is manufactured using resin composition including the metal particles. Accordingly, the metal particles are distributed in the center layer of the article, when the metal particles are added to the thermoplastic resin to prepare a conventional resin composition and into the article. The article has no excellent metal-like texture and luminance, which appears different from appearance of a painted article.

On the contrary, in the case of the laminate sheet according to one embodiment, the metal-resin composite particle is not distributed in the center layer of the metallic resin layer, but dispersed in the metallic resin layer, uniformly.

On the other hand, the metal-resin composite particles may be prepared by specifically depositing a metal on one surface of a first coating layer as a base to form a metal deposition layer and then, a second coating layer on the external surface of the metal deposition layer.

The first and second coating layers may be respectively formed by respectively coating a thermosetting resin composition and curing the thermosetting resin composition by a conventional curing method such as thermal curing or UV curing.

The method of depositing a metal may include a conventional deposition method without a particular limit and specifically, sputtering, E-beam evaporation, thermal evaporation, laser molecular beam epitaxy (L-MBE), pulsed laser deposition (PLD), metal-organic chemical vapor deposition (MOCVD), hydride vapor phase epitaxy (HVPE), and the like.

Another method of forming the metal-resin composite particle may include forming a first coating layer on one side of a thermoplastic resin layer, depositing a metal to form a metal deposition layer, and forming a second coating layer on the external surface of the metal deposition layer. In addition, a third coating layer may be formed on the other side of the thermoplastic resin layer having the first coating layer, the metal deposition layer, and the second coating layer, and then after a metal deposition layer is formed thereon, a fourth coating layer is formed on an on the external surface of the metal deposition layer.

The metal-resin composite particle may be prepared singularly or in a mixture of the manufacturing methods, and the method may be more than one time repetitively applied to form multi-layered metal-resin composite particles.

Second Thermoplastic Resin

The second thermoplastic resin may be a polycarbonate resin, a rubber modified vinyl-based copolymer resin, a polyester resin, a polyalkyl(meth)acrylate resin, a styrene-based polymer, a polyolefin resin, or a combination thereof.

The second thermoplastic resin may have a refractive index of 1.45 to 1.55.

When the second thermoplastic resin has a refractive index within the range, the laminate sheet including the metallic resin layer including the second thermoplastic resin and the article using the same may have excellent metal-like texture and very excellent luminance.

Particularly, when the first coating layer, the second coating layer and the second thermoplastic resin have a similar refractive index, the laminate sheet and using the same article may have a similar metal-like texture to that of a painted one while not being painted, and very excellent luminance.

The second thermoplastic resin may be transparent or translucent. That is, the second thermoplastic resin may have a haze of 0.5 to 40%. Specifically, the haze may be 0.5 to 35%, 0.5 to 30%, 0.5 to 25%, 0.5 to 20%, or 0.5 to 15%.

The transparency of the first and second coating layers indicates that the layers transmit all the incident lights and the translucence thereof indicates that the layers partially transmit all the incident lights.

When the second thermoplastic resin has a haze within the range, the laminate sheet and the article including the metallic resin layer including the second thermoplastic resin may have a similar metal-like texture and luminance to that of a painted one without being painted.

The second thermoplastic resin may be transparent or translucent, and may be any generally-used thermoplastic resin in the field of one embodiment, without limitation.

For example, as described, the second thermoplastic resin may be a polycarbonate resin, a rubber modified vinyl-based copolymer resin, a polyester resin, a polyalkyl(meth)acrylate resin, a styrene-based polymer, a polyolefin resin, or a combination thereof.

The polycarbonate resin may be prepared by reacting diphenols with a compound of a phosgene, halogen formate, carbonate ester, or a combination thereof.

Examples of the diphenols include hydroquinone, resorcinol, 4,4'-dihydroxydiphenyl, 2,2-bis(4-hydroxyphenyl)propane (referred to as bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Of the diphenols, 2,2-bis(4-hydroxyphenyl)propane, 2,2-bis(3,5-dichloro-4-hydroxyphenyl)propane or 1,1-bis(4-hydroxyphenyl)cyclohexane may be preferably used, and 2,2-bis(4-hydroxyphenyl)propane may be more preferably used.

The polycarbonate resin may have a weight average molecular weight of 10,000 to 200,000 g/mol, and specifically 15,000 to 80,000 g/mol, without limitation.

The polycarbonate resin may be a mixture of copolymers obtained using two or more dipenols that differ from each other. The polycarbonate resin may include a linear polycarbonate resin, a branched polycarbonate resin, a polyestercarbonate copolymer resin, and the like.

The linear polycarbonate resin may include a bisphenol-A-based polycarbonate resin. The branched polycarbonate resin may be produced by reacting a multi-functional aromatic compound such as trimellitic anhydride, trimellitic acid, and the like with diphenols and a carbonate. The multi-functional aromatic compound may be included in an amount of 0.05 to 2.0 mol % based on the total weight of the branched polycarbonate resin. The polyester carbonate copolymer resin may be produced by reacting difunctional carboxylic acid with diphenols and a carbonate. The carbonate may include diaryl carbonate such as diphenyl carbonate, ethylene carbonate, and the like.

The rubber modified vinyl-based copolymer resin may include 5 to 95 wt % of a vinyl-based polymer and 5 to 95 wt % of a rubbery polymer.

The rubbery polymer may include a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM) rubber, a polyorganosiloxane/polyalkyl(meth)acrylate rubber composite, or a combination thereof.

The vinyl-based polymer may be a polymer of 50 to 95 wt % of a first vinyl-based monomer of an aromatic vinyl monomer, an acryl-based monomer, a heterocyclic monomer, or a combination thereof; and 5 to 50 wt % of a second vinyl-based monomer of an unsaturated nitrile monomer, an acryl-based monomer, a heterocyclic monomer, or a combination thereof.

The aromatic vinyl monomer may be styrene, C1 to C10 alkyl-substituted styrene, halogen-substituted styrene, or a combination thereof. The alkyl-substituted styrene may include o-ethyl styrene, m-ethyl styrene, p-ethyl styrene, α-methyl styrene, and the like.

The acryl-based monomer may include (meth)acrylic acid alkyl ester, (meth)acrylic acid ester, or a combination thereof. Herein, the alkyl may be a C1 to C10 alkyl. The (meth)acrylic acid alkyl ester may include methyl(meth)acrylate, ethyl(meth)acrylate, propyl(meth)acrylate, butyl(meth)acrylate, and the like, and among them, methyl(meth)acrylate may be preferable. Examples of the (meth)acrylic acid ester may be (meth)acrylate and the like.

The heterocyclic monomer may be maleic anhydride, alkyl- or phenyl N-substituted maleimide, or a combination thereof.

The unsaturated nitrile monomer may include acrylonitrile, methacrylonitrile, ethacrylonitrile, or a combination thereof.

When the rubber modified vinyl-based graft copolymer resin is prepared, a rubber particle may have a particle diameter of 0.1 to 1 μm to improve the impact resistance and surface characteristics of an article, and when the particle diameter of the rubber particle ranges from 0.1 to 1 μm, excellent impact strength may be secured.

The rubber modified vinyl-based copolymer resin may be used singularly or as a mixture of two or more.

Specific examples of the rubber modified vinyl-based copolymer resin may include a styrene, acrylonitrile, and optionally methyl(meth)acrylate graft-copolymerized on a butadiene rubber, an acrylic rubber, or a styrene/butadiene rubber as a mixture.

Another example of the rubber modified vinyl-based copolymer resin may be a copolymer including methyl(meth)acrylate graft-copolymerized with a butadiene rubber, an acrylic rubber, or a styrene/butadiene rubber.

The method of preparing the rubber modified vinyl-based graft copolymer resin is widely known to those skilled in the art, and may be any one of emulsion polymerization, suspension polymerization, solution polymerization or massive polymerization.

The polyester resin is an aromatic polyester resin and may include a condensation-polymerized resin obtained from melt polymerization of terephthalic acid or alkylester terephthalate, and a C2 to C10 glycol component. Herein, the alkyl may be a C1 to C10 alkyl.

The aromatic polyester resin may include a polyethylene terephthalate resin, a polytrimethylene terephthalate resin, a polybutylene terephthalate resin, a polyhexamethylene terephthalate resin, a polycyclohexane dimethylene terephthalate resin, or a polyester resin modified into a non-crystalline resin by mixing the resins with another monomer, and among them a polyethylene terephthalate resin, a polytrimethylene terephthalate resin, a polybutylene terephthalate resin, and a non-crystalline polyethylene terephthalate resin may be preferably used, and a polybutylene terephthalate resin and a polyethylene terephthalate resin may be more preferably used.

The polyethylene terephthalate resin may be a condensation-polymerized polymer obtained through a direct ester reaction or an ester exchange reaction of an ethylene glycol monomer and a terephthalic acid or dimethyl terephthalate monomer.

In addition, in order to increase the impact strength of the polybutylene terephthalate resin, the polybutylene terephthalate resin may be copolymerized with polytetramethylene glycol (PTMG), polyethylene glycol (PEG), polypropylene glycol (PPG), a low molecular-weight aliphatic polyester, or aliphatic polyamide, it may be used in the form of a modified polybutylene terephthalate resin obtained by blending with a component improving an impact strength.

The polyalkyl(meth)acrylate resin may be obtained by polymerizing a monomer material including an alkyl(meth)acrylate through a known polymerization method, such as a suspension polymerization method, a massive polymerization method, an emulsion method and the like.

The alkyl(meth)acrylate may have a C1 to C10 alkyl group, and may include methyl(meth)acrylate, ethyl(meth)acrylate, butyl(meth)acrylate, glycidyl(meth)acrylate, hydroxyethyl(meth)acrylate, and the like.

The polyalkyl(meth)acrylate may have a weight average molecular weight of 10,000 to 200,000 g/mol, and specifically 15,000 to 150,000 g/mol. When the polyalkyl(meth)acrylate has a weight average molecular weight within the range, hydrolysis resistance, scratch resistance, workability, and the like may be improved.

The styrene-based polymer may be a polymer including 20 to 100 wt % of a styrene-based monomer; and 0 to 80 wt % of a vinyl-based monomer selected from an acryl-based monomer, a heterocyclic monomer, an unsaturated nitrile monomer, or a combination thereof. The styrene-based polymer may be for example a rubber modified styrene-based polymer such as a rubber-reinforced polystyrene resin (HIPS).

The styrene-based monomer may be styrene, C1 to C10 alkyl-substituted styrene, halogen-substituted styrene, or a combination thereof. The alkyl-substituted styrene may include o-ethyl styrene, m-ethyl styrene, p-ethyl styrene, α-methyl styrene, and the like.

The acryl-based monomer may include (meth)acrylic acid alkyl ester, (meth)acrylic acid ester, or a combination thereof. Herein, the alkyl may be a C1 to C10 alkyl. The (meth)acrylic acid alkyl ester may include methyl(meth)acrylate, ethyl(meth)acrylate, propyl(meth)acrylate, butyl(meth)acrylate, and the like, and among them, methyl(meth)acrylate may be preferable. Examples of the (meth)acrylic acid ester may be (meth)acrylate, and the like.

The heterocyclic monomer may be maleic anhydride, alkyl- or phenyl N-substituted maleimide, or a combination thereof.

The unsaturated nitrile monomer may include acrylonitrile, methacrylonitrile, ethacrylonitrile, or a combination thereof.

The styrene-based polymer may be selected from a copolymer of a styrene-based monomer and an unsaturated nitrile monomer, a copolymer of a styrene-based monomer and an acryl-based monomer, a copolymer of a styrene-based monomer, an unsaturated nitrile monomer, and an acryl-based monomer, a styrene-based homopolymer of a styrene-based monomer, and a combination thereof.

The styrene-based polymer may have a weight average molecular weight of 40,000 to 500,000 g/mol.

The styrene-based polymer may be prepared using emulsion polymerization, suspension polymerization, solution polymerization, massive polymerization, and the like.

The polyolefin resin may be a polyethylene resin (PE), a polypropylene resin (PP) or a copolymer thereof.

The thermoplastic resin may be an alloy including two or more kinds of resins.

Third Thermoplastic Resin

The laminate sheet may further include a skin layer.

The skin layer may include a third thermoplastic resin, may be transparent or translucent, and may be positioned on the external surface of the metallic resin layer.

Herein, the second thermoplastic resin and the third thermoplastic resin may be the same or different from each other.

The skin layer may be a monolayer or a multilayer of greater than or equal to two layers.

The laminate sheet further includes the skin layer and thus, may further improve the metal-like texture, metal particle texture and luminance of the metallic resin layer and protect the metallic resin layer from an exterior environment such as a scratch, a contamination and the like.

The third thermoplastic resin may have a refractive index of 1.45 to 1.55.

When the third thermoplastic resin has a refractive index within the range, the laminate sheet including the skin layer including the third thermoplastic resin and the article using the same has very excellent metal-like texture and luminance.

In particular, when the second thermoplastic resin and the third thermoplastic resin have a similar refractive index to each other, the laminate sheet and using the same article may have similar metal-like texture to that of a painted one while not being painted and has very excellent luminance.

The third thermoplastic resin may be transparent or translucent. That is, the third thermoplastic resin may have a haze of 0.5 to 40%. Specifically, it may be 0.5 to 9%, 0.5 to 8%, 0.5 to 7%, 0.5 to 6%, or 0.5 to 5%.

The transparency indicates that all the incident lights are almost transmitted, and the translucence indicates that all the lights are partially transmitted.

When the third thermoplastic resin has a haze within the range, the laminate sheet including the skin layer including the third thermoplastic resin and the article may have a similar metal-like texture and luminance to that of a painted article while not being painted and may have very excellent luminance.

The third thermoplastic resin may be any generally-used thermoplastic resin that is transparent or translucent in the field of one embodiment without limitation.

Specifically, the third thermoplastic resin may be a polycarbonate resin, a rubber modified vinyl-based copolymer resin, a polyester resin, a polyalkyl(meth)acrylate resin, a styrene-based polymer, a polyolefin resin, or a combination thereof.

The polycarbonate resin, the rubber modified vinyl-based graft copolymer resin, the polyester resin, the polyalkyl (meth)acrylate resin, the polystyrene resin, the styrene-based polymer, and polyolefin resin are the same as the descriptions for the second thermoplastic resin.

Other Additive

The base layer, the metallic resin layer, or the skin layer may further include an additive of an antibacterial agent, a heat stabilizer, an antioxidant, a release agent, a light stabilizer, a surfactant, a coupling agent, a plasticizer, an admixture, a colorant, a stabilizer, a lubricant, an anti-static agent, a coloring aid, a flame proofing agent, a weather-resistance agent, an ultraviolet (UV) absorber, an ultraviolet (UV) blocking agent, a nucleating agent, an adhesion aid, an adhesive, or a combination thereof.

The antioxidant may include a phenol, phosphite, thioether, or amine antioxidant. The release agent may include a fluorine-included polymer, silicon oil, a stearic metal salt, a montanic metal salt, a montanic ester wax, or a polyethylene wax.

The weather-resistance agent may include benzophenone-type or amine-type weather-resistance agents, and the colorant may include a dye or a pigment. The ultraviolet (UV) ray blocking agent may include titanium oxide ($TiO_2$) or carbon black. The nucleating agent may include talc or clay. The additive may be included in a predetermined amount as long as it does not deteriorate the properties of the base layer, the metallic resin layer, or the skin layer, and specifically may be included in an amount of less than or equal to 40 parts by weight, more specifically 0.1 to 30 parts by weight based on each 100 parts by weight of the first thermoplastic resin for the base layer, the second thermoplastic resin for the metallic resin layer, or the third thermoplastic resin for the skin layer.

In another embodiment, a method of manufacturing a laminate sheet includes coextruding at least one composition for forming a base layer and at least one composition for forming a metallic resin layer.

The composition for forming a base layer includes the first thermoplastic resin.

The composition for forming the metallic resin layer includes the second thermoplastic resin and the metal-resin composite particle. The first thermoplastic resin and the second thermoplastic resin may be the same or different from each other.

The metal-resin composite particle includes a metal deposition layer, a first coating layer positioned on one side of the metal deposition layer, and a second coating layer positioned on the other side of the metal deposition layer, and each of the first coating layer and second coating layer includes a thermosetting resin.

The descriptions for the first thermoplastic resin, second thermoplastic resin and metal-resin composite particle are the same as the descriptions for the laminate sheet according to one embodiment, and thus the explanations therefor are not provided.

When the laminate sheet is manufactured according to the manufacturing method, the laminate sheet may include at least one base layer including a first thermoplastic resin; and at least one metallic resin layer disposed on one side or both sides of the base layer and including a second thermoplastic resin and a metal-resin composite particle.

When the laminate sheet is manufactured according to the manufacturing method, that is, a coextrusion method, appearance problems such as a flow mark, a weld line and the like that are generated in an injection molding method are not generated, and thus, appearance characteristics of the laminate sheet are remarkably improved.

The coextruding may include extruding the at least one composition for forming a base layer, the at least one composition for forming a metallic resin layer, and at least one composition for forming a skin layer. The composition for forming a skin layer may include a third thermoplastic resin and may be transparent or translucent. The skin layer may be positioned on the external surface of the metallic resin layer in the manufactured laminate sheet.

The laminate sheet manufactured according to the method may include at least one base layer; metallic resin layer disposed on one side or both sides of the base layer; and at least one skin layer positioned at the external surface of the metallic resin layer.

The laminate sheet further includes the skin layer and thus, may further improve the metal-like texture, metal particle texture and luminance of the metallic resin layer and protect the metallic resin layer from an external environment such as a scratch, a contamination and the like.

The description for the third thermoplastic resin is the same as the description for the laminate sheet one embodiment, and thus may not provided.

As described above, in yet another embodiment, an article manufactured using the laminate sheet is provided.

The article may be manufactured in various methods. Specifically, the article may be manufactured by vacuum-molding the laminate sheet.

When the laminate sheet is vacuum-molded into an article, there is no problem of a flow mark, a weld line and the like that may be generated during an injection molding.

The article may have a metal-like texture and particularly, include an IT article, a domestic electric appliance, an interior/exterior material for an auto, furniture, an interior item, and a plastic exterior product such as miscellaneous goods, and the like.

Specifically, the article may be a refrigerator inner liner. Or, the refrigerator inner liner may be a refrigerator door inner liner.

The article according to one embodiment has excellent metal-like texture. In one embodiment, the metal-like texture is evaluated using a flop index.

The flop index may be obtained by the following Equation 1.

$$\text{Flop Index} = \frac{2.69(L^*_{15°} - L^*_{110°})^{1.11}}{(L^*_{45°})^{0.86}} \quad \text{[Equation 1]}$$

In Equation 1, L*(x °) indicates luminance measured at x °.

The flop index is obtained by measuring reflectivity change while an angle of reflection is revolved and by specifically, measuring luminance (L*) at each reflection angle of 15°, 45° and 110° an then, calculating the measurements according to the Equation 1. In one embodiment, the flop index is measured using a BYK Mac spectrophotometer (BYK Inc.).

One surface having no metal-like texture has a flop index of 0, and a metal has a flop index ranging from about 15 to about 17. A metal-like texture coating used for an automobile body paint has a flop index of about 11, and the metal-like texture sensed by eyes has a flop index of greater than or equal to about 6.5.

An article according to one embodiment may have a flop index of 11 to 25.

Specifically, the flop index may be in a range of 15 to 25, or 18 to 25.

The article according to one embodiment also has excellent metal particle texture. In one embodiment, the metal particle texture uses a sparkle intensity as an index. The sparkle intensity may be obtained according to the following Equation 2.

$$\Delta S_{total} = \sqrt{\frac{\Delta S_{15°}^2 + \Delta S_{45°}^2 + \Delta S_{75°}^2 + \Delta G^2}{4}} \quad \text{[Equation 2]}$$

In Equation 2, $\Delta S(x°)$ indicates sparkle intensity measured at $x°$, and $\Delta G$ is diffusion of each $S(x°)$ and indicates graininess of metal particles. The sparkle intensity ($\Delta S_{total}$) of the article is calculated according to the Equation 2 after measuring each sparkle intensity at 15°, 45°, and 75°. The method of measuring the sparkle intensity is schematically provided in FIG. 2. In one embodiment, the sparkle intensity is measured using a MA98 multi-angle spectrophotometer (X-Rite Inc.).

The sparkle intensity calculated according to Equation 2 is obtained by combining the following factors.

[Four Factors]
① Reflectivity of the individual effect pigment
② Amounts of effect pigment
③ Amounts of metal particle (Size of the flakes)
④ Orientation of metal particle (Flake orientation)

The article according to one embodiment may have a sparkle intensity of 8 to 20. Specifically, it may have a sparkle intensity of 10 to 20 or 12 to 20.

The article according to one embodiment may have improved luminance. In one embodiment, the luminance as an index showing brightness such as metal gloss is measured using a gloss level at 60° with an UGV-6P digital variable glossmeter (SUGA Inc.).

The article according to one embodiment may have luminance of 70 to 100%.

The luminance may be specifically 70 to 95%, 75 to 100%, 75 to 95%, 80 to 100%, or 80 to 95%.

Thereby, the article according to one embodiment may have a similar metal-like texture and luminance to that of a painted article while not being painted.

In still another embodiment, a method of manufacturing an article includes coextruding at least one composition for forming a base layer and at least one composition for forming a metallic resin layer; and vacuum-molding the coextruded laminate sheet to manufacture an article.

The composition for forming a base layer includes the first thermoplastic resin, and the composition for forming the metallic resin layer includes the second thermoplastic resin and the metal-resin composite particle.

The first thermoplastic resin and the second thermoplastic resin may be the same or different from each other.

The metal-resin composite particle includes a metal deposition layer, a first coating layer positioned on one side of the metal deposition layer and a second coating layer positioned on the other side of the metal deposition layer, and the first coating layer and the second coating layer include a thermosetting resin respectively.

The descriptions for the first thermoplastic resin, the second thermoplastic resin and the metal-resin composite particle are the same as the descriptions for the laminate sheet according to one embodiment, and thus the explanations therefor are not provided.

The coextruding the at least one composition for forming a base layer and at least one composition for forming a metallic resin layer is the same as the descriptions for the method of manufacturing the laminate sheet according to one embodiment.

When the laminate sheet is vacuum-molded into an article, there is no problem of a flow mark, a weld line and the like that may be generated in an injection molding.

The article manufactured according to the method may realize a metal-like texture and luminance close to those of a painted article without painting.

Specifically, the article manufactured according to the method may realize the above flop index, sparkle intensity and luminance.

MODE FOR INVENTION

Hereinafter, the present invention is illustrated in more detail with reference to preferable examples. These examples, however, are not in any sense to be interpreted as limiting the scope of the invention.

EXAMPLES

Article according to exemplary embodiments were manufactured to have the same composition under the same condition as provided in the following Table 1 by injection-molding or coextruding a laminate sheet and vacuum-forming it and then, distinguished by marking '0' thereon.

When the articles were manufactured in the vacuum-molding method, that is, the articles according to Examples 1 to 4 and Comparative Examples 1 to 2, the composition provided in the following Table 1 was a resin composition for forming a metallic resin layer of a laminate sheet, and the method of manufacturing the article was described in detail below.

TABLE 1

| Component and molding method | unit | Example | | | | Comparative Example | | | | | | | |
|---|---|---|---|---|---|---|---|---|---|---|---|---|---|
| | | 1 | 2 | 3 | 4 | 1 | 2 | 3 | 4 | 5 | 6 | 7 | 8 |
| Thermoplastic resin (A) | wt % | 100 | 100 | 100 | 100 | 100 | 100 | 100 | 100 | 100 | 100 | 100 | 100 |
| Metal-resin composite particle (B) | parts by weight | 1.0 | 2.0 | 1.0 | 1.0 | — | — | 0.3 | 1.0 | 2.0 | — | — | — |

TABLE 1-continued

| Component and molding method | unit | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| Metal particle-1 (C) | parts by weight | — | — | 1.0 | — | 2.0 | — | — | — | — | 0.3 | — | — |
| Metal particle-2 (D) | parts by weight | — | — | — | 1.0 | — | 2.0 | — | — | — | — | 0.3 | — |
| Injection molding | — | — | — | — | — | — | — | ○ | ○ | ○ | ○ | ○ | ○ |
| laminate sheet vacuum-molding | — | ○ | ○ | ○ | ○ | ○ | ○ | — | — | — | — | — | — |

(reference): an article of Comparative Example 8 was aluminum-painted.

Each component used in the Table 1 will be illustrated as follows.

(A) Thermoplastic Resin: a transparent acrylonitrile-butadiene-styrene-methylmethacrylate copolymer resin made by Cheil Industries Inc. (Korea) and having a refractive index of 1.52 and a haze of 1.7% when manufactured into a 3.2 mm-thick specimen.

(B) Metal-resin Composite Particle: a metal-resin composite particle included an aluminum vacuum deposition layer, a first coating layer positioned on one side of the aluminum vacuum deposition layer, and a second coating layer on the other side of the aluminum vacuum deposition layer. Herein, the first and second coating layers used 70 wt % of a silicone resin and 30 wt % of polyvinyl butyral (PVB), and had a refractive index of 1.47, and the metal-resin composite particle had an average particle diameter of about 100 μm and a thickness of about 1.3 μm.

(C) Metal Particle-1: an amorphous sheet-shaped aluminum particle having an average particle diameter of about 100 μm and a thickness of about 20 μm and made by Nihonboitz (Japan).

(D) Metal Particle-2: an amorphous sheet-shaped aluminum particle having an average particle diameter of about 8 μm and a thickness of about 0.1 μm and made by Silberline Manufacturing Co., Inc. (U.S.A.).

Examples 1 to 4 and Comparative Examples 1 to 8

Each resin composition according to Examples 1 to 4 and Comparative Examples 1 to 8 was prepared by respectively using the aforementioned components to have the compositions provided in the Table 1. The resin compositions were respectively extruded into a pellet at a temperature ranging from 180 to 240° C. in a common twin-screw extruder.

The resin compositions according to Examples 1 to 4 and Comparative Examples 1 to 2 were resin compositions for forming a base layer, and herein, used was an acrylonitrile-butadiene-styrene copolymer (ABS) resin including 20 wt % of a butadiene rubber consisting of butadiene rubber particles having an average particle diameter of 0.25 μm, 23 wt % of acrylonitrile, and a styrene-acrylonitrile copolymer having a weight average molecular weight of about 200,000 g/mol, and made into a pellet by Cheil Industries Inc. (Korea). In addition, a transparent polymethylmethacrylate (PMMA) resin having a refractive index of 1.48 and a haze of 0.7% when manufactured into a 3.2 mm-thick specimen and made into a pellet by Cheil Industries Inc. (Korea) was used as a resin composition for forming a skin layer. The resin composition pellets for a base layer, a metallic resin layer, and a skin layer were respectively dried at 80° C. for 4 hours, coextruded at 180 to 240° C. in an extruder, manufacturing a multi-layered laminate sheet in which the base layer, the metallic resin layer, and the skin layer were stacked in order. Then, each laminate sheet was vacuum-molded in a common method and cut, respectively manufacturing an article specimen (width×length×thickness=100 mm×150 mm×3 mm).

As for Comparative Examples 3 to 8, a 6 Oz injection-molder was used after drying each pellet at 80° C. for 4 hours. Herein, after setting a cylinder temperature at 220 to 250° C., a molding temperature at 100° C., and a molding cycle time for 30 seconds, article specimens (width×length×thickness=100 mm×150 mm×3 mm) were manufactured through injection-molding to have a weld line on the surface by using a mold having two gates. On the other hand, the article specimen according to Comparative Example 8 was painted with aluminum.

Experimental Example

The article specimens were evaluated according to the following method, and the results are provided in the following Table 2.

TABLE 2

|  | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|
| Metal-like texture (Flop index) | 20 | 24 | 18 | 21 | 7 | 15 | 15 | 20 | 24 | 5 | 13 | 15 |
| Metal particle texture (Sparkle intensity) | 14 | 18 | 15 | 12 | 11 | 6 | 12 | 14 | 18 | 9 | 5 | 10 |
| luminance (Gloss level, 60°) | 82% | 87% | 80% | 75% | 67% | 72% | 77% | 83% | 89% | 62% | 68% | 90% |

TABLE 2-continued

|  |  | Example | | | | Comparative Example | | | | | | | |
| --- | --- | --- | --- | --- | --- | --- | --- | --- | --- | --- | --- | --- | --- |
|  |  | 1 | 2 | 3 | 4 | 1 | 2 | 3 | 4 | 5 | 6 | 7 | 8 |
| Article | Flow mark | 4 | 4 | 4 | 4 | 4 | 4 | 3 | 3 | 3 | 3 | 1 | 4 |
| appearance | Weld line | 4 | 4 | 4 | 4 | 4 | 4 | 3 | 3 | 3 | 3 | 1 | 4 |

Experimental Example 1: Flop Index

A flop index was used to evaluate the metal-like texture of the article according to one embodiment. The flop index of the article was measured by using a BYK-Mac spectrophotometer (BYK Inc.).

Referring to Table 2, the aluminum-painted article according to Comparative Example 8 showed a flop index of 15. The articles according to Examples 1 to 4 were not aluminum-painted but showed a flop index ranging from 18 to 24 and realized a metal-like texture near to that of a painted article.

On the other hand, Comparative Examples 1, 2, 6 and 7 using a conventional metal particle rather than a metal-resin composite particle according to one embodiment showed a remarkably low flop index or insufficient sparkle intensity or article appearance despite a high flop index.

Experimental Example 2: Sparkle Intensity

Sparkle intensity was used as an index showing the metal particle texture of the article of one embodiment. The sparkle intensity of the article according to one embodiment was measured by using a multi-angle spectrophotometer (MA98, X-Rite Inc.).

Referring to Table 2, the aluminum-painted article according to Comparative Example 8 had a sparkle intensity of 10. The articles according to Examples 1 to 4 were not painted but had sparkle intensity ranging from 12 to 18 and realized a metal particle texture near to that of the painted article.

On the other hand, Comparative Examples 1, 2, 6 and 7 using a conventional metal particle rather than a metal-resin composite particle according to one embodiment showed remarkably low sparkle intensity or an insufficient flop index or article appearance despite high sparkle intensity.

Experimental Example 3: Luminance

In one embodiment, luminance was evaluated as an index showing brightness such as metal gloss by measuring a gloss level at 60° with an UGV-6P digital variable glossmeter (SUGA Inc.).

Referring to Table 2, the aluminum-painted article according to Comparative Example 8 had luminance of 90%. The articles of Examples 1 to 4 showed 75 to 87% of luminance close to that of a painted article without painting.

On the other hand, Comparative Examples 1, 2, 6 and 7 using a conventional metal particle rather than a metal-resin composite particle according to one embodiment showed still remarkably low luminance or an insufficient flop index, sparkle intensity, or article appearance despite high luminance.

Experimental Example 4: Article Appearance

The articles according to Example and Comparative Example were observed with naked eyes regarding appearance, that is, flow mark and weld line degrees. The appearance of the articles was evaluated with a reference to the following Table 3.

TABLE 3

| Index of article appearance | Article appearance |
| --- | --- |
| 1 | A different color of greater than or equal to 70% to less than or equal to 100% in the flow mark or weld line As depicted in FIG. 4A |
| 2 | A different color of greater than or equal to 50% to less than or equal to 70% in the flow mark or weld line flow mark As depicted in FIG. 4B |
| 3 | A different color of greater than or equal to 10% to less than or equal to 50% in the flow mark or weld line flow mark As depicted in FIG. 4C |
| 4 | A different color of less than or equal to 10% in the flow mark or weld line flow mark As depicted in FIG. 4D |

Referring to the Table 2, the laminate sheets according to Examples 1 to 4 were manufactured through coextrusion and thus, had no appearance problem such as a flow mark or a weld line generated when a laminate sheet was vacuum-molded.

Comparative Examples 1 and 2 used the same method as Examples 1 to 4 and thus, had no appearance problem generated in an injection molding method.

However, Comparative Examples 3 to 7 using an injection molding method showed a different color in a flow mark and a weld line on the appearance of the articles, and particularly, Comparative Example 7 using a conventional metal particle-2 (D) showed 70 to 100% of a different color in a flow mark and a weld line.

FIG. 3 is a photograph showing a refrigerator inner liner as an article according to one embodiment in order to effectively show the metal-like texture, metal particle texture, luminance and appearance characteristics of a vacuum-molded article using a laminate sheet according to one embodiment.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting this disclosure in any way.

DESCRIPTION OF SYMBOLS

101: first coating layer
102: second coating layer
103: metal deposition layer

The invention claimed is:

1. A laminate sheet comprising:
    at least one base layer including a first thermoplastic resin; and
    at least one metallic resin layer disposed on one side or both sides of the base layer and including a second thermoplastic resin and a metal-resin composite particle,
    wherein the first thermoplastic resin and the second thermoplastic resin are the same or different from each other,
    the metal-resin composite particle has a laminate-structure having three or more layers, the laminate-structure comprising a first coating layer comprising a thermosetting resin, a second coating layer comprising a thermosetting resin, and a metal deposition layer disposed between the first coating layer and the second coating layer,
    the metal deposition layer has a thickness of 0.01 to 1.0 µm,
    wherein at least one side surface of the metal deposition layer is exposed outside of the thermosetting resin, and
    wherein at least one of the first coating layer and the second coating layer of the metal-resin composite particle comprises polyvinyl butyral (PVB).

2. The laminate sheet of claim 1, wherein the metal deposition layer is an aluminum deposition layer.

3. The laminate sheet of claim 1, wherein the thermosetting resin comprises a phenolic resin, an epoxy resin, an unsaturated polyester resin, an urethane resin, an urea resin, a melamine resin, an alkyd resin, a silicone resin, or a combination thereof.

4. The laminate sheet of claim 1, wherein the thermosetting resin has a refractive index of 1.45 to 1.55.

5. The laminate sheet of claim 1, wherein each of the first coating layer and the second coating layer is transparent or translucent.

6. The laminate sheet of claim 1, wherein the metal-resin composite particle further comprises a thermoplastic resin layer,
    wherein the thermoplastic resin layer is positioned on at least one of the external surfaces of the first and second coating layers.

7. The laminate sheet of claim 1, wherein the metal-resin composite particle has a thickness of 1.01 to 100 µm.

8. The laminate sheet of claim 1, wherein the metal-resin composite particle has an average particle diameter of 2 to 2,000 µm.

9. The laminate sheet of claim 1, wherein the metal-resin composite particle is included in an amount of 0.5 to 5.0 parts by weight based on 100 parts by weight of the second thermoplastic resin.

10. The laminate sheet of claim 1, wherein the first thermoplastic resin and the second thermoplastic resin are the same or different from each other, and independently comprise a polycarbonate resin, a rubber modified vinyl-based copolymer resin, a polyester resin, a polyalkyl(meth)acrylate resin, a styrene-based polymer, a polyolefin resin, or a combination thereof.

11. The laminate sheet of claim 1, wherein the second thermoplastic resin has a refractive index of 1.45 to 1.55.

12. The laminate sheet of claim 1, wherein the second thermoplastic resin is transparent or translucent.

13. The laminate sheet of claim 1, wherein the laminate sheet further comprises a skin layer,
    wherein the skin layer comprises a third thermoplastic resin, is transparent or translucent, and is positioned on the external surface of the metallic resin layer.

14. An article manufactured using the laminate sheet of claim 1.

15. The article of claim 14, wherein the article is manufactured by vacuum-molding the laminate sheet.

16. The article of claim 14, the article is a refrigerator inner liner.

17. The article of claim 14, wherein the article has a flop index of 11 to 25, a sparkle intensity of 8 to 20, and luminance of 70 to 100% measured based on a gloss level at an angle of 60°.

18. The laminate sheet of claim 1, wherein at least one of the first coating layer and the second coating layer of the metal-resin composite particle further comprises a silicone resin.

19. The laminate sheet of claim 18, wherein at least one of the first thermoplastic resin and the second thermoplastic resin comprises a rubber modified vinyl-based copolymer resin and/or a polyalkyl(meth)acrylate resin.

20. The laminate sheet of claim 19, wherein at least one of the first thermoplastic resin and the second thermoplastic resin comprises an acrylonitrile-butadiene-styrene (ABS)-based copolymer resin.

21. The laminate sheet of claim 1, wherein the metal-resin composite particle has a multi-layer laminate structure.

22. A method of manufacturing a laminate sheet comprising:
    coextruding at least one composition for forming a base layer and at least one composition for forming a metallic resin layer,
    wherein the composition for forming a base layer comprises a first thermoplastic resin,
    the composition for forming a metallic resin layer comprises a second thermoplastic resin and a metal-resin composite particle,
    the first thermoplastic resin and the second thermoplastic resin are the same or different from each other,
    the metal-resin composite particle has a laminate-structure having three or more layers, the laminate-structure comprising a first coating layer comprising a thermosetting resin, a second coating layer comprising a thermosetting resin, and a metal deposition layer disposed between the first coating layer and the second coating layer,
    the metal deposition layer has a thickness of 0.01 to 1.0 µm,
    wherein at least one side surface of the metal deposition layer is exposed outside of the thermosetting resin, and
    wherein at least one of the first coating layer and the second coating layer of the metal-resin composite particle comprises polyvinyl butyral (PVB).

23. The method of claim 22, wherein the coextruding comprises:
    coextruding the at least one composition for forming a base layer, the at least one composition for forming a metallic resin layer, and at least one composition for forming a skin layer,
    wherein the composition for forming a skin layer comprises a third thermoplastic resin, and is transparent or translucent, and
    the skin layer is positioned on the external surface of the metallic resin layer in the manufactured laminate sheet.

* * * * *